March 4, 1924.

R. A. STEVENSON

LETTER SCALE

Filed March 23, 1921

WITNESSES:
R. E. Stevenson
A. F. Stevenson

Inventor
Robert A. Stevenson

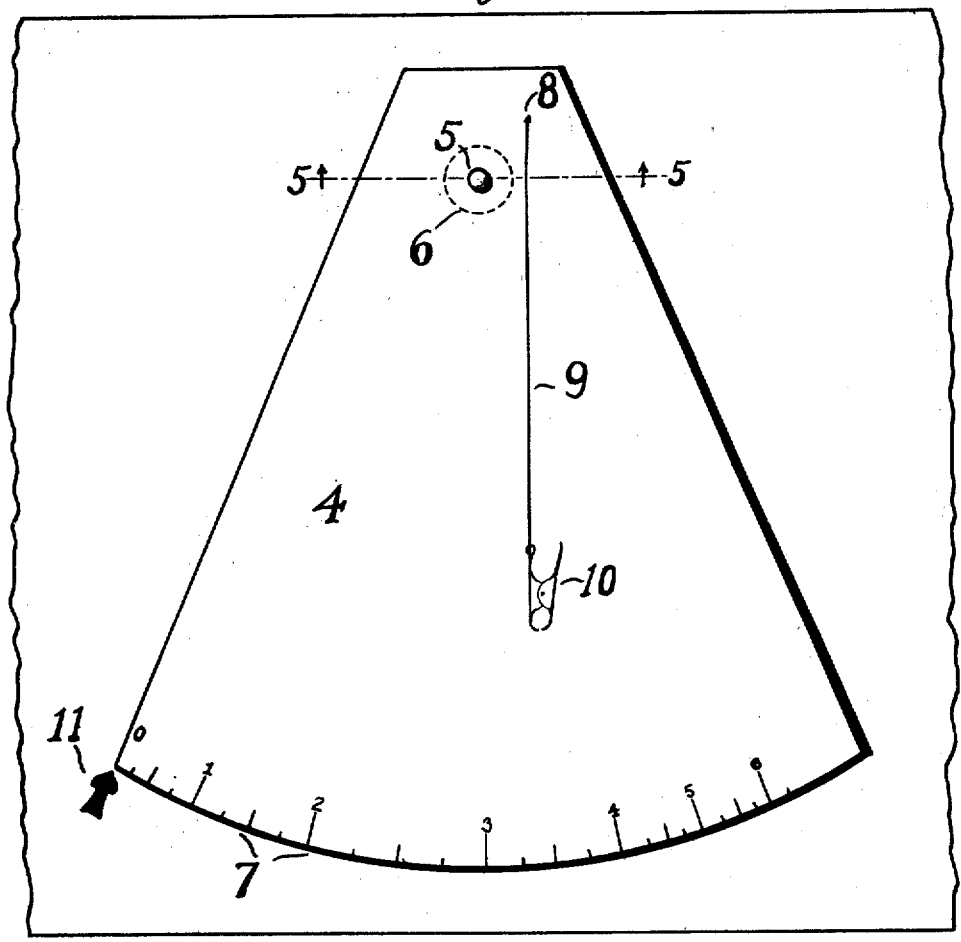

Patented Mar. 4, 1924.

1,486,054

UNITED STATES PATENT OFFICE.

ROBERT ALVIN STEVENSON, OF LANCASTER, OHIO.

LETTER SCALE.

Application filed March 23, 1921. Serial No. 454,643.

*To all whom it may concern:*

Be it known that I, ROBERT ALVIN STEVENSON, a citizen of the United States, and a resident of Lancaster, in the county of Fairfield and State of Ohio, have invented a new and Improved Letter Scale, of which the following is a full and exact specification.

My invention relates to scales used for the purpose of weighing light objects such as postal matter and which are operative without the use of springs, my purpose being to produce a device of this character so simple in construction that it can be made cheaply enough to be suitable for use as an advertising medium for gratuitous distribution.

More particularly stated, I seek to produce a device of this character which operates without counterbalancing weights by using the weight of the device itself as the means of securing equilibrium.

Reference is made to the accompanying drawings forming a part of this specification, and in which similar numerals refer to similar parts throughout the several views.

Figure 4 shows another form of my invention.

Figure 5 is a cross section on line 5—5 of Figure 4 looking in the direction of the arrows.

Figure 1:
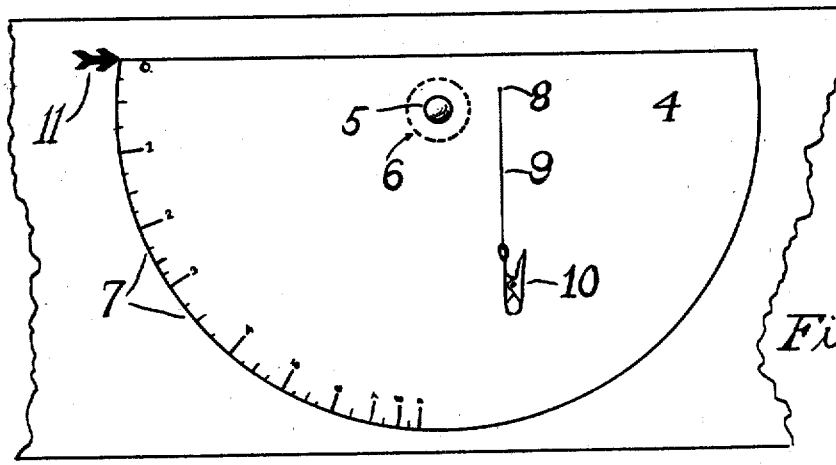
Figure 1 is a side view of my invention.
Figure 2:
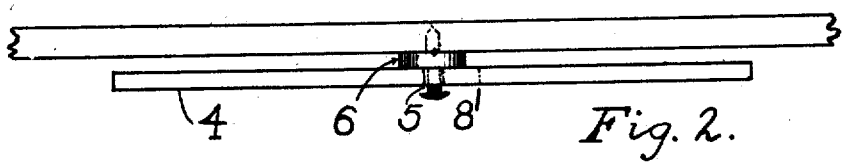
Figure 2 is an edge view.
Figure 3:
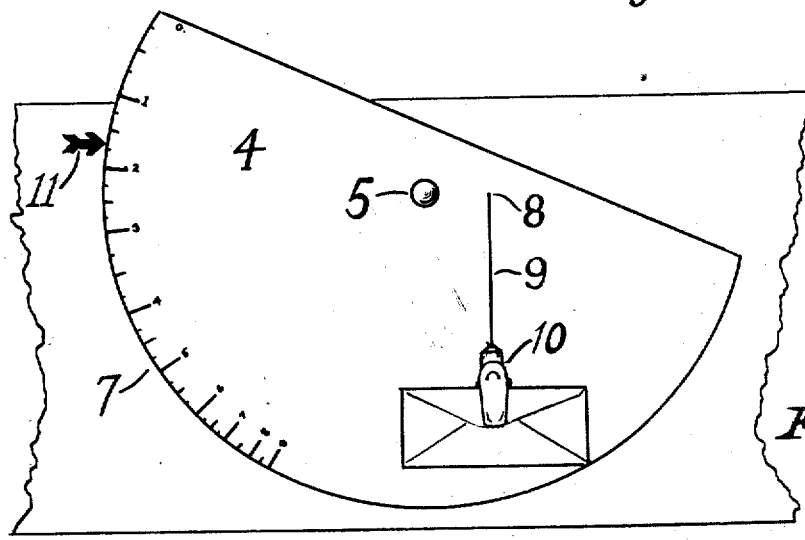
Figure 3 is a side view of the scale loaded.

The letter-scale is composed principally of a cardboard plate 4, substantially semi-circular in shape. The semi-circular edge of the plate 4 describes an arc of a circle at the center of which is a small hole or eye 5. At this eye 5 the plate 4 is suspended so that it will be free to swing. On the back of the plate 4 and behind the eye 5 is attached a small washer 6, as shown in Figures 1 and 2.

At 7 is a graduated scale adjacent the periphery of the plate 4 and extending part way around the same. This scale is divided into ounces and fractions thereof by suitable division marks.

Separate from the plate 4 and located opposite the graduated scale 7 is a small marker 11 which acts as the indicator.

At the point 8 on the right-hand side of the plate 4 is attached one end of a length of cord or other strong flexible material 9, at the other end of which is secured a spring clip 10 of ordinary construction capable of grasping and holding the letter which is to be weighed.

To operate this letter-scale a nail or the like is inserted through the eye 5 and driven into a wall or other perpendicular support so that the nail acts as the pivot about which the plate 4 can freely swing. With the plate 4 hanging suspended from the nail and unloaded the marker 11 is attached to the wall opposite and coinciding with the 0 or zero mark on the graduated scale 7. This marker 11 acts as the indicator and may be made by attaching a tack or pin or by pasting a piece of paper or other material at the above mentioned point. In this instance, a gummed paper arrow is attached to the wall for the indicator. The edge of the letter or other object to be weighed is inserted between the jaws of the spring clip 10. The weight of the object will cause the plate 4 to turn in a clockwise direction about the pivot-point and thus carry the graduated scale 7 past the indicator 11 until an equilibrium is established. The weight is then shown on the scale 7 directly opposite the point of the indicator 11.

By this method of using a semi-circular plate no weight is required to counterbalance the weight of the letter or object weighed other than the weight of the plate itself. As a large arc is covered by the scale 7 the divisions may be made wide apart. Thus, my device constitutes a sufficiently accurate scale for ordinary use and is very simple in construction.

In order to prevent the device from rubbing on the wall and thus cause more or less inaccuracy the washer 6 is interposed between the back of the plate 4 and the wall. This washer tends to hold the device away from the wall and allow it to swing with a minimum of friction.

The form of my invention shown in Figure 4 is operated as described above.

My invention may be embodied otherwise than as herein shown. Therefore, I do not limit myself to the precise arrangement shown in the drawings and above described.

What I claim as my invention and desire to secure by Letters Patent of the United States, is as follows—

In a device of the class described, the combination with a supporting element having an indicating mark thereon, of a relatively flat member having an arcuate outer edge thereon struck from a center within the area of said member, means fixedly pivoting the member at the center from which said arcuate edge is struck to the support upon which said indicator mark is positioned, whereby the member depends under its own weight to have said arcuate edge lowermost with respect to the pivotal mounting of the member, and means providing delineations upon the plate adjacent the outer arcuate edge thereof extending from said indicator mark upon the support below the pivot point of the member when the same is normally suspended, a flexible cord eccentrically pivoted upon the member upwardly of the pivotal point of the member upon said support, and an article gripping device supported upon the lower free end of said flexible cord.

ROBERT ALVIN STEVENSON.

Witnesses:
R. E. STEVENSON,
A. F. STEVENSON.